No. 667,031. Patented Jan. 29, 1901.
W. H. McGILL.
COMBINED TAPE MEASURE AND IMPLEMENT HANDLE.
(Application filed Apr. 3, 1900.)
(No Model.)
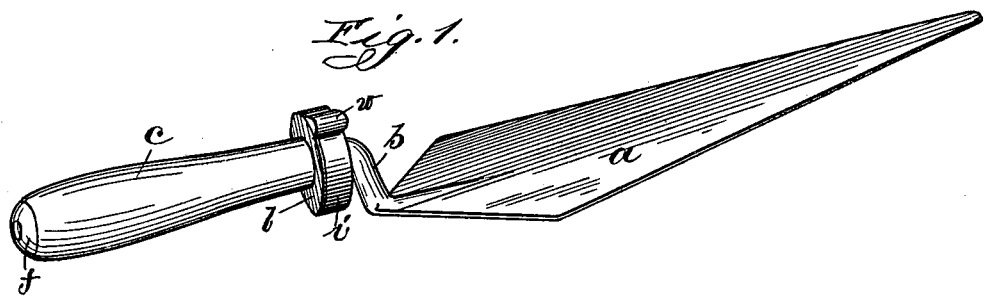
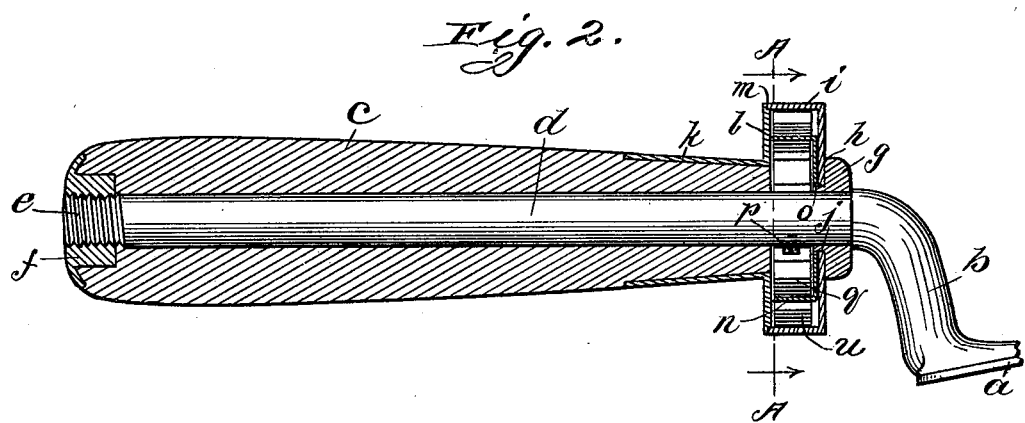
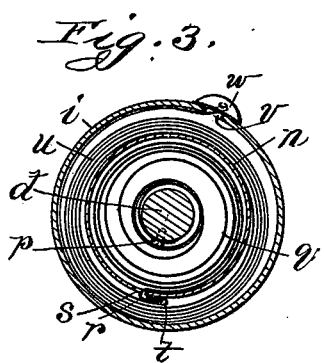 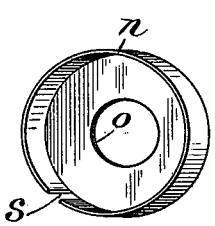 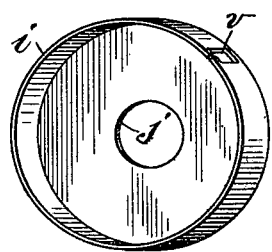
Witnesses:
R. J. Jacker.
Hattie O. Halvorson.
Inventor:
William H. McGill,
By Coburn, Stibben & McElroy,
Attys.

UNITED STATES PATENT OFFICE.

WILLIAM H. McGILL, OF CHICAGO, ILLINOIS, ASSIGNOR OF ONE-HALF TO WILLIAM S. BOUGHER, OF SAME PLACE.

COMBINED TAPE-MEASURE AND IMPLEMENT-HANDLE.

SPECIFICATION forming part of Letters Patent No. 667,031, dated January 29, 1901.

Application filed April 3, 1900. Serial No. 11,300. (No model.)

*To all whom it may concern:*

Be it known that I, WILLIAM H. McGILL, a citizen of the United States, residing at Chicago, (Englewood,) in the county of Cook and State of Illinois, have invented a certain new and useful Combined Tape-Measure and Implement-Handle, of which the following is a specification.

My invention relates to a new and useful improvement in trowels, whereby I structurally combine a tape-measure with the handle of an implement such as a trowel, in a position where it will be out of the way when the trowel is in ordinary use, but which can be instantly brought into use without even laying down the trowel when any measurements have to be made, as is often the case in bricklaying and masonry construction.

To fully illustrate my invention, I attach hereto a sheet of drawings in which the same letters of reference are used to designate identical parts in all the figures, of which—

Figure 1 is a perspective view of a trowel to which my invention is applied. Fig. 2 is a longitudinal sectional view through the handle on a somewhat larger scale. Fig. 3 is a sectional view on the line A A of Fig. 2. Fig. 4 is a perspective view of the short cup-like cylinder forming a part of the mechanism employed, and Fig. 5 is a similar perspective view of the main portion of the casing for the tape-spring.

The blade $a$ is of the customary construction, as is also the shank $b$, as they form no part of my invention, which may be applied to any hand implement. The handle $c$ is in the main constructed in the customary manner, but differs in the points to be mentioned.

In carrying out my invention I preferably employ a handle of wood, through which extends the rod-like continuation $d$ of the shank, the outer end of which is screw-threaded, as at $e$, and takes into a screw-threaded metallic nut $f$, secured from rotation in the end of the handle $c$. Rigidly secured upon or formed integral with the inner end of the extension $d$ and immediately adjacent to the shank proper of the trowel is the collar $g$, which is formed with the shoulder $h$. Loosely mounted on the shoulder $h$, just referred to, is the shallow cylindrical cup $i$, which has an aperture $j$ therein, just large enough to permit the reduced portion of the collar $g$ to pass therethrough. The wooden portion of the handle $c$ is provided with a metal ferrule $k$, which has its inner end spread into the form of a disk $l$, of the same diameter as the cup $i$. This disk $l$ preferably has a shoulder $m$ (shown in Fig. 2) formed on its outer edge, into which the edge of the cylindrical portion of the cup $i$ takes, as clearly shown in Fig. 2. It will be apparent that when the handle $c$ is screwed tightly in place by means of the nut $f$, coöperating with the screw-threaded portion $e$, the disk $l$, coöperating with the cup $i$, will clamp it securely in place against the collar $g$. Loosely mounted inside of the casing thus formed is the smaller cylinder or cup $n$, which is shaped like the cup $i$, except that it is only about two-thirds as wide and is slightly shallower. It also is provided with an aperture $o$, through which the reduced portion of the collar $g$ passes, the construction being such that the cylinder $n$ can rotate freely within the casing. Rigidly secured to the extension $d$ of the shank $b$, inside of the casing thus formed, as by the screw $p$, is one end of a spirally-coiled spring $q$, the other end of which is secured to the inside of the flange of the cylinder or cup $n$, conveniently by having said other end formed into a hook $r$, which catches over one edge of the notch $s$, cut into the flange of the cup. Likewise secured to the outer surface of the cup $n$, as by forming a hook $t$ thereon and catching it over the hook $r$, is a graduated tape $u$, which is normally coiled about the flange of the cylinder or cup $n$ and has its other end projecting through an aperture $v$, formed in the periphery of the cup $i$. To prevent this end being drawn entirely inside by the stress of the spring $q$, I provide an enlargement $w$ thereon, which preferably takes the form of a section of a short cylinder, as seen in Figs. 1 and 3, to which the outer end of the tape is pivotally secured. This enlargement $w$ has its outer surface curved, so as to not cause any mortar or other material to readily adhere thereto, and has its edges flush with the edges of the casing, so that as it is seized by this end the tape can be readily drawn out of the casing.

The operation of my improved construction will be readily apparent. When it is desired to make a measurement, the enlargement $w$ is seized and the tape is pulled out, the rotating of the cylinder $n$ thus caused putting the spring $q$ under tension, so that when the tape is released it is drawn back into the casing until the aperture $v$ is closed by the enlargement $w$.

What I claim as new, and desire to secure by Letters Patent of the United States, is—

1. In a device of the class described, the combination with the handle and the shank of an implement secured thereto, of the casing clamped between the end of said handle and the shank and having a peripheral aperture therein, the cylinder rotatably mounted within said casing, the coiled spring having one end secured to said shank and the other end to said cylinder, and the tape having one end secured to said cylinder and adapted to be wound thereabout and the other end passing through said peripheral aperture and provided with an enlargement to prevent its being drawn entirely within said casing.

2. In a device of the class described, the combination with the handle, of the casing secured thereto and consisting of a ferrule secured to the end of the handle coöperating with a cup interposed between said handle and the shank of the implement, said cup being provided with a peripheral aperture therein, the cylinder rotatably mounted within said casing, the coiled spring having one end secured to said handle and the other end to said cylinder, and a tape having one end secured to said cylinder and adapted to be wound thereabout and the other end passing through said peripheral aperture and provided with an enlargement to prevent its being drawn entirely within said casing.

3. In a device of the class described, the combination with the handle $c$ having the nut $f$ in the outer end thereof and the ferrule $k$ carrying the disk $l$ secured to the inner end, of the shank $b$ of an implement having the collar $g$ secured thereon, and the cylindrical cup $i$ clamped between said collar and the disk $l$ by means of the screw-threaded end $e$ of the extension $d$ coöperating with said nut.

4. In a device of the class described, the combination with the handle $c$ having the nut $f$ in the outer end thereof and a ferrule $k$ with the disk $l$ formed thereon secured at the inner end, of the shank $b$ of an implement having the collar $g$ secured thereon, the cylindrical cup $i$ clamped between said collar and the disk $l$ by means of the screw-threaded end of the extension $d$ of the shank coöperating with the nut $f$, the cylindrical cup being provided with the peripheral aperture $v$, the cylinder $n$ rotatably mounted within said casing the coiled spring $q$ having one end secured to the extension $d$ and the other end to the cylinder $n$, and the tape $u$ having one end secured to the cylinder $n$ and adapted to be wound thereabout and the other end passing through the aperture $u$ and provided with an enlargement $w$ to prevent its being drawn entirely within said aperture.

WILLIAM H. McGILL.

Witnesses:
CHAS. H. KEHL,
WM. C. KRAUTER.